(12) United States Patent
Thoi et al.

(10) Patent No.: US 8,782,856 B2
(45) Date of Patent: Jul. 22, 2014

(54) ROPE TERMINATION

(75) Inventors: Hong Tri Thoi, Manchester (GB); David Stuart Rowley, Ninfield Battle (GB)

(73) Assignees: First Subsea Limited, Lancaster (GB); Offspring International Limited, West Midlands (GB)

( * ) Notice: Subject to any disclaimer, the term of this patent is extended or adjusted under 35 U.S.C. 154(b) by 237 days.

(21) Appl. No.: 13/266,828

(22) PCT Filed: Apr. 21, 2010

(86) PCT No.: PCT/GB2010/050647
§ 371 (c)(1),
(2), (4) Date: Oct. 28, 2011

(87) PCT Pub. No.: WO2010/125370
PCT Pub. Date: Nov. 4, 2010

(65) Prior Publication Data
US 2012/0036683 A1    Feb. 16, 2012

(30) Foreign Application Priority Data
Apr. 30, 2009   (GB) .................................. 0907416.2

(51) Int. Cl.
*F16G 11/00*   (2006.01)
*F16G 15/08*   (2006.01)

(52) U.S. Cl.
CPC ................ *F16G 11/00* (2013.01); *F16G 15/08* (2013.01)
USPC ......................... 24/122.6; 24/122.3; 403/275

(58) Field of Classification Search
USPC ........... 24/122.6, 573.09, 579.09, 122.3, 305; 403/310–312, 185, 275, 342
See application file for complete search history.

(56) References Cited

U.S. PATENT DOCUMENTS

| | | | | | |
|---|---|---|---|---|---|
| 427,302 | A | * | 5/1890 | Dumas | 403/275 |
| 741,605 | A | * | 10/1903 | Young | 439/814 |
| 1,214,709 | A | * | 2/1917 | Orr | 403/275 |
| 1,236,115 | A | * | 8/1917 | Shepard | 403/274 |
| 1,429,371 | A | * | 9/1922 | Shaffer | 24/122.3 |
| 1,824,005 | A | * | 9/1931 | Astley | 403/185 |
| 1,885,316 | A | * | 11/1932 | Astley | 24/122.3 |
| 3,309,744 | A | * | 3/1967 | Sironi et al. | 24/122.6 |
| 3,775,811 | A | * | 12/1973 | Smrekar et al. | 24/122.6 |

(Continued)

FOREIGN PATENT DOCUMENTS

| | | |
|---|---|---|
| DE | 141801 | 3/1902 |
| JP | 57001031 | 1/1982 |

*Primary Examiner* — Robert J Sandy
*Assistant Examiner* — Rowland Do
(74) *Attorney, Agent, or Firm* — Stoel Rives LLP

(57) ABSTRACT

A rope termination (10) for a rope (19) having a plurality of sub-ropes (21 -32), the rope termination including a connection device having a load pin (12) wherein each of the plurality of sub-ropes (21 -32) is spliced into itself to form a looped end, wherein the looped ends are arranged on the load pin and each of the plurality of sub-ropes (21 -32) is of equal length. The connection device further includes a connector (34) for a rope connection assembly whereby tension is equally transferred between the load pin and each of the plurality of sub-ropes.

23 Claims, 10 Drawing Sheets

(56) References Cited

U.S. PATENT DOCUMENTS

| | | | | |
|---|---|---|---|---|
| 3,932,697 A | * | 1/1976 | Hood | 174/79 |
| 3,945,263 A | | 3/1976 | Simonsen et al. | |
| 4,066,368 A | * | 1/1978 | Mastalski et al. | 403/211 |
| 4,121,325 A | * | 10/1978 | Bruinette et al. | 24/122.6 |
| 4,585,369 A | | 4/1986 | Manesse et al. | |
| 4,734,961 A | | 4/1988 | Guthmann | |
| 5,539,960 A | * | 7/1996 | Vanasse et al. | 24/122.6 |
| 6,061,879 A | * | 5/2000 | Ericson et al. | 24/304 |

* cited by examiner

ROPE TERMINATION

CROSS-REFERENCE TO RELATED APPLICATIONS

This application is a national stage application under 35 U.S.C. §371 of International Application No. PCT/GB2010/050647, titled ROPE TERMINATION, filed Apr. 21, 2010, which claims priority to Great Britain Patent Application No. 0907416.2, filed Apr. 30, 2009, both of which are hereby incorporated by reference in their entireties.

This invention relates to rope terminations, and more particularly to rope terminations for ropes having a plurality of sub-ropes.

BACKGROUND

Synthetic multi-core ropes are used in a wide variety of fields, but are being increasingly used in the oil and gas industries, due to their strength and versatility. Amongst other tethering applications, multi-core ropes are used in the oil and gas industries to moor offshore facilities and anchor lines to the sea bed.

Multi-core ropes can be made to withstand very heavy loads before breaking, in some cases supporting many thousands of tonnes. The strength of a multi-core rope is derived from its composition, typically being made up of many smaller fibre ropes, known as sub-ropes, that are bundled together so as to run parallel to one another along the length of the rope. Although multi-core ropes are capable of withstanding high loads, their maximum load strength is determined by their weakest point, which is often a termination or connection point. Indeed, in most applications it is essential that a termination and/or connection be employed at some point along the length of the rope for the rope to be of use.

A rope termination for terminating a yarn rope is described in U.S. Pat. No. 3,932,697 (Hood) which comprises a frusto-conical body having a tapered peripheral surface and an axial bore. The rope yarns are inserted into the bore at the narrow end of the fitting and divided into two pairs of bundles with each pair being splayed diametrically outwards and returning along the outside of the fitting. The bundles are wrapped helically in opposite directions about the periphery of the main section of the rope for a predetermined distance and secured by means of tape or twine lashing wrapped several times around the ends of the bundles. When tension is applied downwardly to the rope (or upwardly to the fitting), the wrapped bundles cooperate to grip the periphery of the rope to fasten the fitting thereto. The Hood termination is specifically suited to providing a termination point for yarn fibres in a rope where it is desirable to separate the outer fibres from an inner core (such as an electrical cable). Although the Hood termination meets this need, it would not be suitable for providing a termination of a multi-core synthetic rope that would be able to withstand the typical loads encountered in the oil and gas industries.

Another termination is described in WO-A-2005/054710 (Marlow Ropes Limited). The Marlow document describes a termination for use with marine ropes where individual sub-ropes of a rope are spliced onto themselves forming connecting eyes. The sub-ropes are of varying lengths and their connecting eyes are each arranged onto individual load pins that extend between load plates. The load pins are arranged in a staggered arrangement in two rows with respect to the load plates to keep the transverse dimension of the termination relatively compact. The rope termination is arranged such that the load is transmitted from the rope into the plates through the individual load pins. As shown in FIG. 5 of the Marlow document, two such ropes may be connected to one another by a single load plate with load pins.

U.S. Pat. No. 5,539,960 (Vanasse) discloses a termination for an aramid fibre rope/cable. The termination comprises a threaded coupling provided with an internal sleeve through which the fibres are threaded. However, the fibres are exposed to the environment and are not protected. Also, while the ends of the sleeve over which the fibres are bent are curved, nevertheless, the fibres are distorted at both ends of the sleeve.

It is an object of the present invention to provide an improved termination for a multi-core rope, wherein the sub-ropes are arranged so that the termination can withstand high tensile forces when compared with prior art terminations. It is a further object of the present invention to provide a termination that can be quickly and easily connected to other terminations or fixtures. It is also an object to provide a termination that offers some protection for the sub-ropes and a mechanically advantageous connection between load pins supporting the sub-ropes and a coupling member of the termination

BRIEF SUMMARY OF THE DISCLOSURE

In accordance with a first aspect of the present invention there is provided a rope connection comprising:
  a rope termination of a rope having a longitudinal axis and a plurality of sub-ropes, said rope termination comprising a termination member having proximal and distal ends and a plurality of load pins formed in a closed annulus around said longitudinal axis, each of said plurality of sub-ropes being spliced into itself to form a looped end arranged around said load pins and each of said plurality of sub-ropes being of equal length, wherein said termination member further comprises at least two tabs interconnecting said load pins, which tabs extend radially outwardly from said axis such that a circular cylindrical surface centred on and parallel said longitudinal axis and intersecting said tabs entirely surrounds said load pins and said sub-ropes disposed around said load pins, said rope extending from the proximal end of the termination member; and
  a connector for connection with said tabs;
  whereby tension in the rope is equally transferred to said connector through said tabs and equally divided between said load pins and each of said plurality of sub-ropes.

This arrangement offers a means for connecting a multi-core rope comprising a plurality of sub-ropes to load pins of a termination that overcomes that above mentioned problems associated with the prior art. In particular, the arrangement of sub-ropes on the load pins minimises compression and abrasion of the constituent fibre elements of the rope thereby reducing the risk of rope failure. By splicing individual sub-ropes as opposed to the whole rope itself, the size of the termination piece can be kept to a minimum.

This is because a rope's strength is decreased as it is bent over a rounded drum. Therefore, as is well known in the art, the radius of curvature of the drum should satisfy a certain ratio with respect to the radius of the rope to minimise the reduction in strength. The actual ratio depends on the type of rope used and its application (pulling, hauling, lifting, lowering etc.). Since the radii of the sub-ropes are each significantly less than the radius of the rope as a whole, the radius of curvature of each load pin can be significantly less than it would need to be to support an entire rope. This means that the size of the load pins, and importantly, the weight of the termination, can be kept to a minimum.

Furthermore, by arranging for the tabs to extend radially beyond the radial extent of the load pins and the sub-ropes thereon, the danger of abrasion of, or impact against, the sub-ropes by external agents can be reduced or even eliminated. Also, because the load experienced by the load pins is transmitted radially outwardly through and by the tabs, two results are achieved. The first is that it is easier to maintain even distribution of the tension in the rope to the sub-ropes, since unbalancing forces (ie not along the longitudinal axis) imposed between the connector and rope termination are more easily corrected to keep the connection aligned and equal tensions in the subropes. Secondly, although the cross section of material of the termination and connector that transmits the tension in the rope must be sufficient to accommodate the maximum tension which the rope is designed to transmit, wherever it is located in the termination, it is easier to distribute this cross section at a radial distance from the axis.

Preferably, said connector comprises a sleeve member having an internal flange on which proximal surfaces of said tabs rest. Said sleeve member may comprise two clamshell halves which are interconnectible about said rope termination, said internal flange being circular. Preferably, the flange is undercut, and said tabs are correspondingly inclined, whereby axial tension on the rope causing axial forces between said tabs and flange serves to draw said clamshell halves towards one another. This reduces any tendency of the shells to part and reduces the tension on fasteners connecting them together.

Alternatively, the sleeve member may be integral and said internal flange interrupted with as many axial gaps as there are tabs, said gaps being arranged around the sleeve in the same spacing as said tabs around said longitudinal axis, whereby said rope termination is insertable axially in said sleeve with said tabs aligned with said gaps and then is rotatable to engage said tabs with said interrupted flange, locking means being provided to prevent subsequent rotation of the rope termination with respect to the sleeve.

The locking means may comprise fixed stops and selectively operable stops at each end of each gap, said selectively operable stop being disengaged to permit insertion of said rope termination in said sleeve. Said selectively operable stops may spring-loaded and have a cam surface engaged by said tabs on insertion of the rope termination in said sleeve to deflect said stops radially outwardly, said stops snapping radially inwardly to prevent back rotation of the rope termination after forward rotation thereof to engage said tabs with said interrupted flange.

The rope connection may employ a connector that is adapted to connect two of said rope terminations end to end.

In another embodiment, said tabs extend distally with respect to the rope and are interconnected to form a terminal body constituting the distal end of the termination member, the connector connecting with said terminal body. In this event, said connection may comprise a cylindrical plug, whose axis is coincident with said longitudinal axis, the plug being disposed on one of said terminal body and connector, and a sleeve socket on the other of said terminal body and connector, wherein a flange is defined on one of said plug and socket and selectively operable locking dogs are on the other of said plug and socket so as to engage with said flange when said is plug is inserted in said socket, whereby said plug is axially locked in said socket.

The locking dogs are optionally spring-loaded so as to snap into engagement with said flange on insertion of said plug in said socket. A seal may be disposed between said connector and said termination when said plug is received in said socket. This prevents corrosive agents such as sea water getting into the internal mechanism of the socket. The seal also prevents the ingress of dirt, sediment or the like and protects the plug and socket from corrosion. In particular, corrosion could cause the profile of the locking dogs and/or flanged portion to change and could jeopardise the integrity of the locked connection.

Said connection may instead comprise a slot in one of said terminal body and connector and a spade member in the other of said terminal body and connector, apertures being formed across said slot and through said spade member that can be aligned when said spade member is inserted in said slot, a pin being receivable in said apertures to make the connection. When the spade member is received within said slot and the pin is in said apertures, the connector may be such as to have only one degree of freedom of movement with respect to the rope termination, comprising partial rotation of one with respect to the other about an axis defined by the pin. Said rotation axis may be perpendicular said longitudinal axis.

The rope connection may be in respect of a rope having m sub-ropes and the termination having n load pins between n tabs, and wherein m/n sub-ropes engage each load pin, where m/n, m and n are all whole numbers.

There may be three load pins arranged in a triangular formation, said tab projecting from each vertex of said triangular formation.

In another aspect, the present invention provides a rope termination of a rope having a longitudinal axis and a plurality of sub-ropes, said rope termination comprising a plurality of load pins formed in a closed loop around said longitudinal axis and each of said plurality of sub-ropes being spliced into itself to form a looped end arranged around said load pins, each of said plurality of sub-ropes being of equal length, wherein said load pins each have a section in a radial plane that comprises a circular end of radius greater than or equal to 1.5 times the radius of the sub-rope and sides that taper by an amount equal to or less than the angle subtended by said looped end of the sub-rope at said splice when arranged around said load pin, such that each said sub-rope is without a deflection between said circular end of the load pin and the splice.

Preferably, the curvature of the circular end is twice the radius of each of said plurality of sub-ropes.

Indeed, the weight of the termination is a significant factor since the terminations are preferably supplied with the rope due to the permanent nature of the spliced looped ends. Smaller, lighter terminations therefore allow for easy and cost-effective transportation and handling.

Furthermore, the rope termination according to the first aspect of the invention transfers load equally from the at least one load pin to each of the sub-ropes. The sub-ropes are not stacked on top of one another on the at least one load pin so no sub-rope exerts a force on another and each sub-rope is of substantially equal length and diameter so each sub-rope undergoes the same stress and strain as all the other sub-ropes when a force is exerted on the at least one load pin. Each sub-rope behaves in the same manner as the remaining sub-ropes, and experiences the same forces, so no one sub-rope is more susceptible to failure than any other sub-rope. If one particular sub-rope did experience greater forces than another sub-rope, then that sub-rope may break at a given load and the load previously experienced by that sub-rope would be distributed to the remaining sub-ropes. This, of course, increases the likelihood of the remaining sub-ropes failing and, if the remaining sub-ropes experience different loads, a cascade of failing sub-ropes may ensue.

In the preferable case where several load pins are arranged in a closed shape, the many sub-ropes of a rope can be distributed on a single termination without significantly deviating radially from their aligned parallel arrangement in the rope. This, again, minimises any reductions in sub-rope strength.

In a preferable embodiment, the plug is a spigot and/or preferably comprises an outwardly radially projecting portion and further preferably, the radially projecting portion comprises load bearing tabs projecting radially from and extending radially beyond said load pin.

Preferably, the socket comprises a flange for retaining said plug and further preferably, said flange and said radially projecting portion are hooked and said radially projecting portion latches against said flange when said rope is under axial load. This provides a non-slip interference fit that resists the plug moving out of the socket. Preferably, the flange is moveable into and out of the axial path of said plug.

In one particular embodiment, the first connector comprises a plug and said second connector comprises a socket; and said second connector comprises a first component and a second component wherein said first component is adapted to engage with said second component. Preferably, the first and second components are connected to one another after the plug is inserted into the socket.

The first and second components can therefore be closed around the plug of the first connector and the plug can be restrained by the socket. Preferably, the first and second components are connectable to one another by fastening bolts to ensure a secure fit. The first and second components preferably engage to form a tube.

In an alternative embodiment, the flange comprises a plurality of locking dogs that are radially moveable into and out of the axial path of said plug. Preferably, the plurality of locking dogs are biased towards a radially inward position. Further preferably, the plug comprises a forward portion extending axially from said load pin and a flanged portion extending from said forward portion. The locking dogs preferably engage said first connector between said load pin and said flanged portion to restrain said plug in said socket.

In one preferable embodiment, the second connector comprises two sockets. This may be used to connect two rope terminations together, where each rope termination comprises a plug. In an alternative preferable embodiment, second connector comprises two plugs and may be used to connect two rope terminations together, where each rope termination comprises a socket. In another preferable embodiment, the second connector comprises at least one plug and at least one socket and may be used to connect two rope terminations together, where one comprises a plug and the other comprises a socket.

It is preferable that the load pin is connected to sub-ropes of equal length so that tension is equally transferred between said load pin and each sub-rope. As described above, with reference to the first aspect of the present invention, this arrangement maximises the tensile strength of the connection, reduces the possibility of unbalanced moments and ultimately reduces the risk of rope failure.

BRIEF DESCRIPTION OF THE DRAWINGS

Embodiments of the invention are further described hereinafter with reference to the accompanying drawings, in which.

DETAILED DESCRIPTION

Figure 1A:
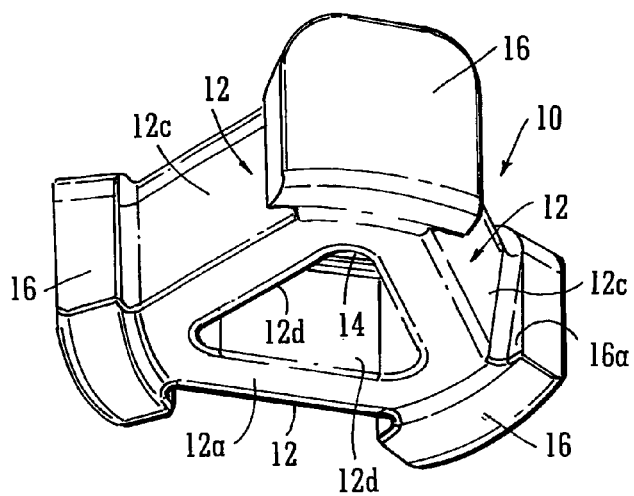
FIGS. 1A and 1B are perspective views of a rope termination according to the invention.

FIGS. 1A to 1D show an exemplary embodiment of a rope termination 10 according to the present invention. The rope termination 10 is for attachment to the end of a multi-core rope so that the rope may be anchored or connected to further similar multi-core ropes via a suitable rope connection assembly. As shown in the figures, the rope termination 10 comprises several load pins 12 arranged to form a closed shape around a central opening 14. In the particular embodiment shown in the figures, three identical load pins 12 are arranged in a triangular formation, however in alternative embodiments, any number of load pins 12 may be arranged into a closed shape. In particular, the closed shape may be a circle or any polygon. Since the load pins 12 of the rope termination 10 form a closed shape with a central opening 14, the rope termination 10 may be referred to as a "donut".

Returning to the particular embodiment shown in the figures, each apex of the triangular shape has a radially projecting tab 16 extending therefrom. In the embodiment shown, the tabs 16 also have circumferential portions 16a that extend circumferentially from each apex. Furthermore, a circumferential edge 16b of each tab 16 is curved so that the profile of each edge 16b corresponds to the circumference of a circle whose plane is perpendicular to and centred on a longitudinal axis 18 of the rope termination 10. The longitudinal axis 18 is perpendicular to the plane of the rope termination 10, as defined by the closed shape formed by the load pins 12, and intersects the rope termination 10 through the centre of the central opening 14.

Figure 1B:
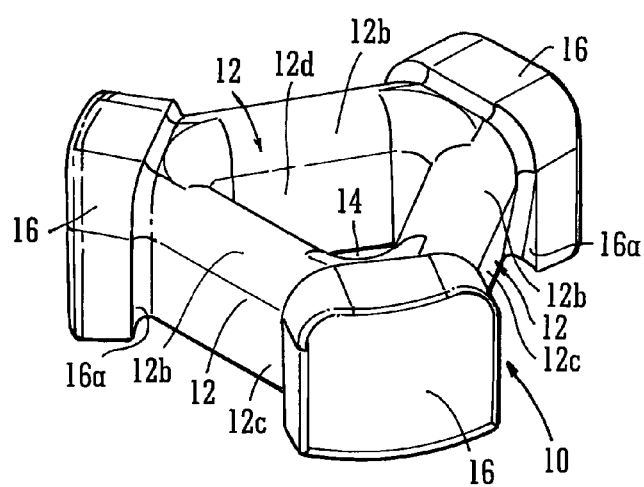
Figure 1C:
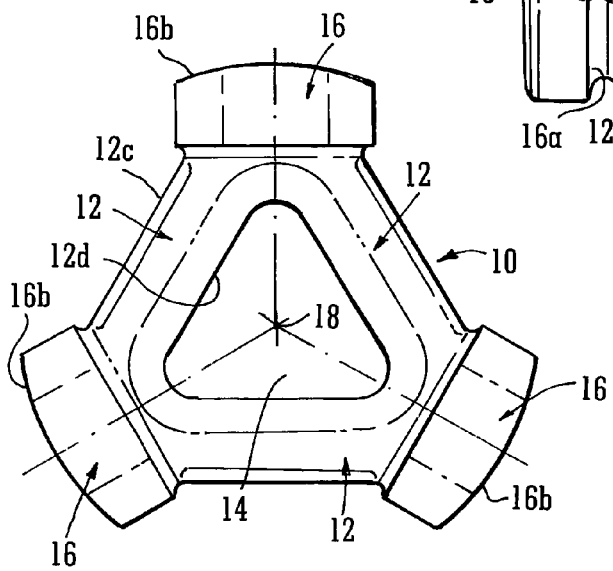
FIG. 1C is a face-on view and FIG. 1D is a side view of the rope termination of FIGS. 1A and 1B.
Figure 1D:
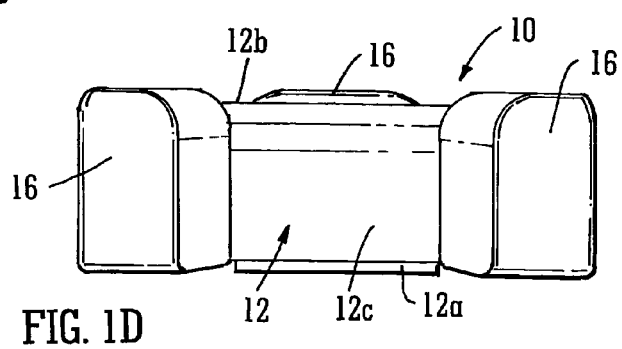

As shown in FIG. 1A, a bottom surface 12a of each load pin 12 is planar and intersects side walls 12c, 12d of each load pin 12. Conversely, as shown in FIG. 1B, a top surface 12b of each load pin 12 is curved wherein the plane of curvature is substantially perpendicular the length of each load pin 12. In preferable embodiments, the top surface 12a of each load pin 12 is curved to correspond to a portion of the circumference of a circle.

Figure 2:
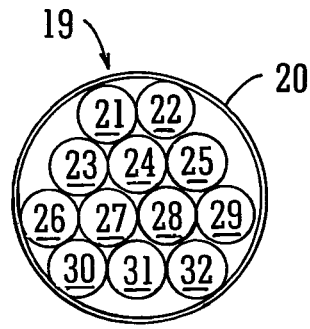
FIG. 2 is a cross sectional view of a multi-core rope showing the individual sub-ropes.

FIG. 2 shows a cross-sectional view of one example of the type of multi-core rope 19 that may be used with the rope termination of the present invention. The particular rope 19 shown in FIG. 2 comprises twelve sub-ropes 21-32 arranged within an outer sheath 20. The skilled reader will note that the rope termination 10 of the present invention may be used with any suitable multi-core rope and is in no way restricted to use with a rope comprising twelve sub-ropes. The outer sheath 20 provides protection to the inner sub-ropes 21-32 and ensures that the sub-ropes 21-32 remain parallel and correctly orientated with respect to one another along the length of rope 19.

Figure 3:
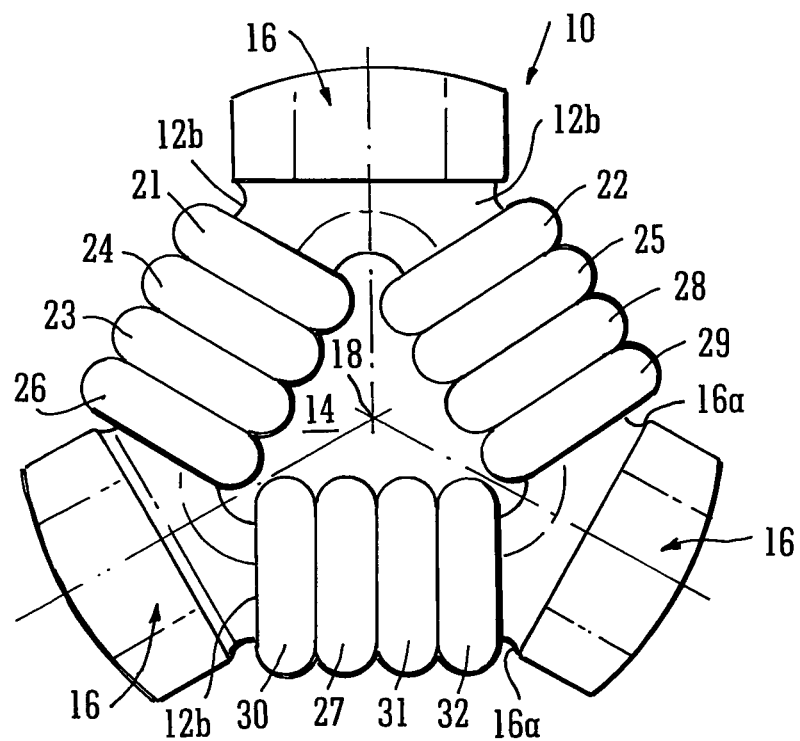
FIG. 3 is a face-on view of the rope termination of FIGS. 1A-1D with a spliced multi-core rope attached.

In order to connect the multi-core rope 19 to the rope termination 10, the outer sheath 20 is pulled back to expose the sub-ropes 21-32 within. Each sub-rope 21-32 is then threaded through the central opening 14 of the rope termination 10 and looped radially outwards returning on itself to towards the main body of the rope 19 forming a looped eye. Each sub-rope 21-32 is spliced back into itself by standard splicing techniques that are well known in the art so that each looped eye loops around a load pin 12 of the rope termination 10. In certain embodiments, the splice may be approximately 2 meters from the rope termination. When spliced, each sub-rope 21-32 is of equal length and is arranged over the load pins 12 of the rope termination 10 as shown in FIG. 3. As can be seen in FIG. 3, the sub-ropes 21-32 are arranged over the load pins 12 so that each load pin 12 supports an equal number of sub-ropes 21-32. In the embodiment shown in FIG. 3, each load pin 12 supports four sub-ropes 21-32 of the twelve sub-rope multi-core rope 19 on its curved top surface 12b. In preferable embodiments, the radius of curvature of each curved top surface 12b is related to the radius of each sub-rope 21-32. In one particularly preferable embodiment, the radius of curvature of each curved top surface 12b is 1.5 times the radius of each sub-rope 21-32. In a further preferable embodiment, the radius of curvature of each curved top surface 12b is twice the radius of each sub-rope 21-32. This ensures that the curved top surface 12b of each load pin 12 does not cause undue stress, irregular wear or accelerated deterioration in each sub-rope.

The radially projecting tabs 16 and particularly the circumferential portions 16a of the tabs 16 restrict movement of the sub-ropes 21-32 along the load pins 12. Each group of sub-ropes (21, 24, 23, 26; 22, 25, 28, 29; and 30, 27, 31, 32) is therefore restrained between two tabs 16. Each sub-rope 21-32 is in direct contact with a load pin 12 and does not lie on top of any other sub-rope 21-32 ensuring that the sub-ropes 21-32 do not crush one another, minimising another failure risk. The arrangement of sub-ropes 21-32 on the load pins 12 also means that the sub-ropes 21-32 do not undergo significant radial displacement with respect to their original undeviated parallel configuration within the main rope 19. Significant radial displacement of the sub-ropes 21-32 from their original parallel configuration can reduce the collective tensile strength of the sub-ropes 21-32. When connected to the rope termination 10, the rope 19 is substantially arranged along the longitudinal axis 18.

Optimum strength in the termination of the rope can be achieved by minimising the risk of unbalanced moments. A symmetrical rope termination connected to spliced sub-ropes of equal length is preferable since it reduces the risk of any one sub-rope experiencing a greater load than the remaining sub-ropes which can produce unwanted torque and an unequal distribution of tension which may ultimately lead to failure of the sub-ropes.

Figure 4:
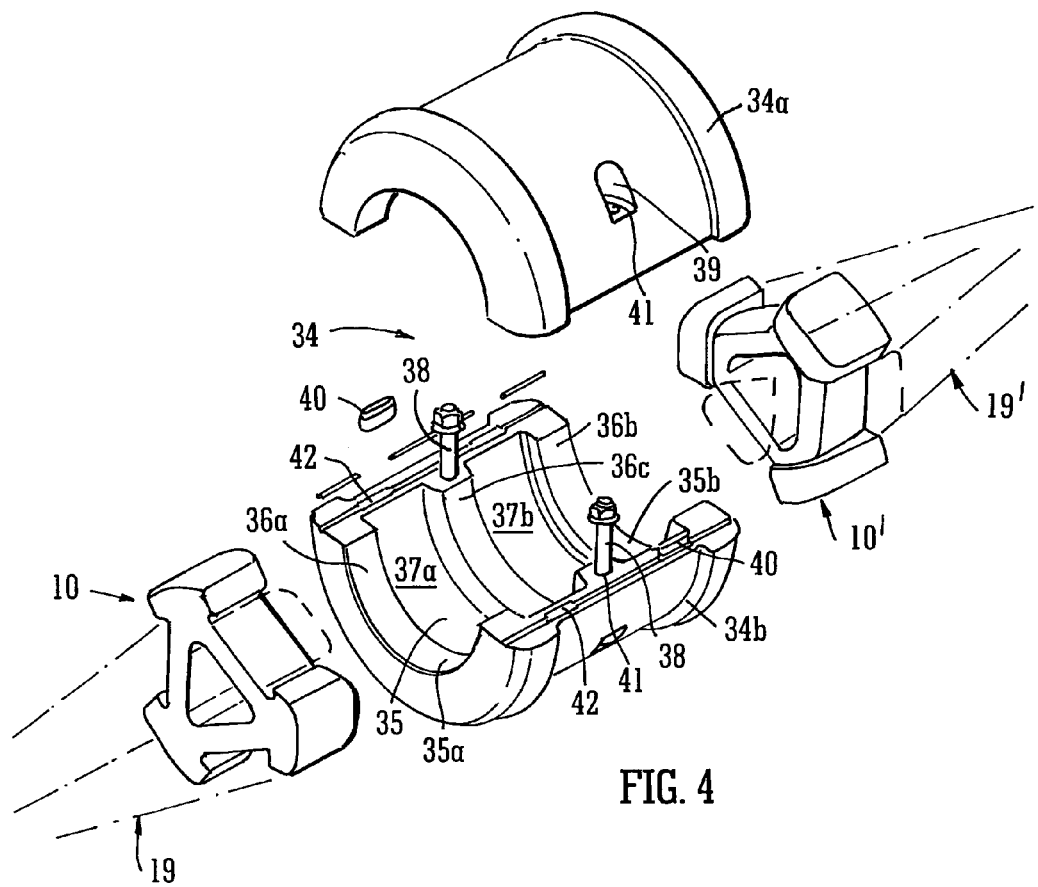
FIG. 4 is an exploded view of one embodiment of a rope connection assembly according to the invention and two rope terminations each connected to a spliced multi-core rope (dashed lines)

FIG. 4 shows a rope connection assembly 34 that is used to restrain two identical rope terminations 10, 10' each connected to respective multi-core ropes 19, 19' with respect to one another. The skilled reader will appreciate equivalent alternative embodiments where the rope connection assembly is attached to a fixed structure or the like, and is used as an anchoring point for a terminated rope. Similarly, the rope connection assembly may comprise one or more plug components that are restrained by a socket-like rope termination. In any case, the main principle of connection is described in relation to the rope connection assembly 34 below.

The rope connection assembly 34 comprises a first component 34a and a second component 34b. In the embodiment shown in FIG. 4, the first component 34a and second component 34b are each half of a generally hollow cylinder. The first component 34a is adapted to engage with the second component 34b to form a tube with a bore 35 having a first open end 35a and a second open end 35b. An inner surface of the rope connection assembly 34 has a first flange 36a located at the first open end 35a and a second flange 36b located at the second open end 35b. A third flange 36c is located on the inner surface intermediate the first flange 36a and second flange 36b forming a first channel 37a between the first and third flange 36a, 36c and forming a second channel between the third and second flange 36c, 36b.

The first component 34a is attached and secured to the second component 34b by bolts 38 that pass through apertures 41 in the first and second components 34a, 34b. The first component comprises recesses 39 so that the bolts 38 can be accessed from outside the rope connection assembly 34. In addition, dowels 40 extend between slots 42 in the first and second components 34a, 34b to limit lateral movement therebetween.

Figure 5A:
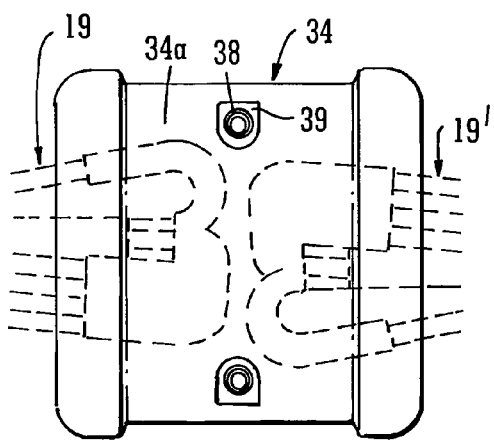
FIG. 5A is top-down view of the rope connection assembly of FIG. 4 with the two rope terminations restrained within and FIG. 5B is a cross sectional view of the rope connection assembly of FIG. 5A.

To create a connection between two rope terminations 10, 10', the rope connection assembly must be in an open state with the first component 34a disconnected from the second component 34b. A first rope termination 10 is then inserted into the (partial) first channel 37a of one of the first or second components 34a, 34b and the second rope termination 10' is inserted into the (partial) second channel 37b of the first or second components 34a, 34b. The first component 34a is then brought into engagement with the second component 34b and secured thereto with bolts 38 and dowels 40, enveloping the rope terminations 10, 10'. The first and second channels 37a, 37b are sized to receive the first and second rope terminations 10, 10' respectively but do not allow significant axial movement thereof within the closed rope connection assembly 24. FIG. 5A shows the rope connection assembly of FIG. 4 closed around two rope terminations. The ropes 29 and 29' are shown in dashed lines to illustrate their relative positions within the rope connection assembly 34. In a closed position, load from the ropes 19, 19' is transferred to the load pins 12, 12' and, in turn, to the rope connection assembly 34. Inevitably, the bolts 38 and dowels 40 will experience some of the load.

Figure 5B:
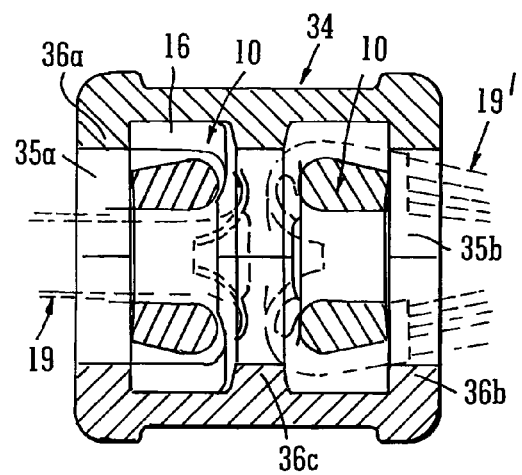
Figure 6A:
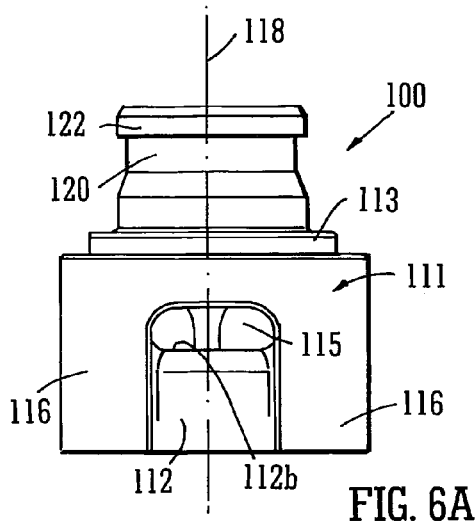
FIG. 6A is a side view of an alternative embodiment of a rope termination according to the invention.
Figure 6B:
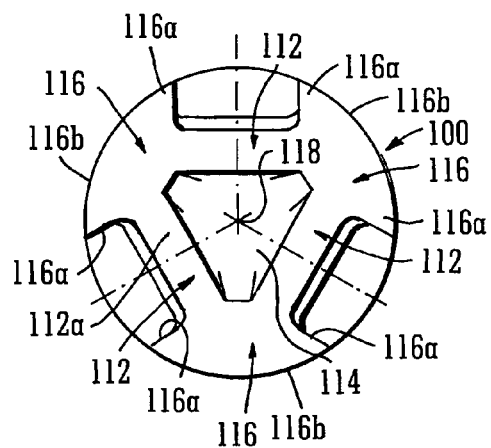
FIG. 6B is a bottom-up view of the rope termination of FIG. 6A.
Figure 6C:
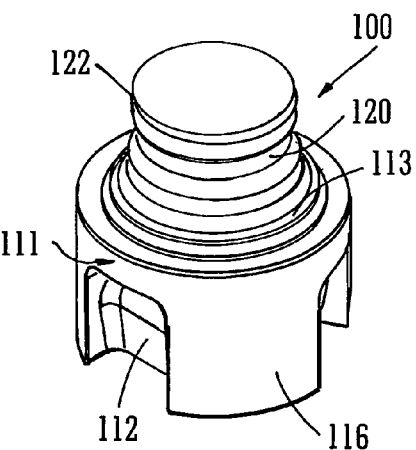
FIGS. 6C and 6D are perspective views of the rope terminations of FIGS. 6A and 6B.
Figure 6D:
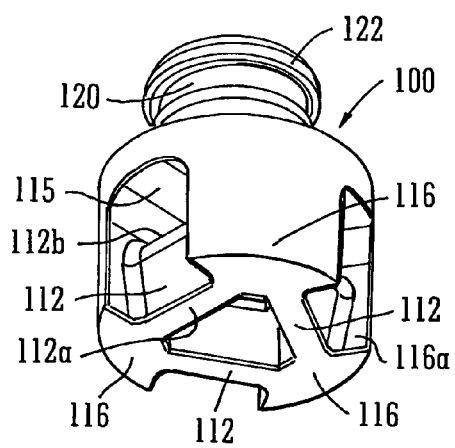

FIG. 5B show a cross-sectional view of the rope connection assembly 34 that shows that relative positions of the rope terminations 10, 10' within. As seen in FIG. 5B in relation to the first rope termination 10, along a radially outward direction, the radially projecting tabs 16 taper axially rearward, towards the origin of the rope 19. The tabs 16 engage with the first flange 36a that is tapered axially inwards, away from the open end 35a, along a radially inward direction. The tapered tab 16 and the tapered first flange 34a engage to form a secure fit that reduces the load transferred to the bolts 38, thereby minimising the risk of the bolts 38 failing. Whilst the tapered tabs 16 and flange 36 are described with reference to the first rope termination 10 and first flange 36a, the same arrangement applies equally to the second rope termination 10' and second flange 36b. Any hooked arrangement may be employed to achieve this effect. The third flange 36c limits the insertion distance of the first and second rope terminations 10, 10' within the rope connection assembly 34.

FIGS. 6A-6D show an alternative rope termination 100 that may be used to terminate the end of a multi-core rope and connect to an anchor point or another rope termination in a rope connection assembly. The rope termination 100 of FIG. 6A to 6D is similar to the rope termination 10 described above in many respects and many of the variations and alternative features described above also apply mutatis mutandis to the rope termination 100. The rope termination 100 shown in FIGS. 6A-6D comprises three load pins 112 arranged in a triangular configuration with a central opening 114 where the plane of the triangular configuration is perpendicular to, and centered on, a longitudinal axis 118 of the rope termination 100. The load pins 112 each comprise a curved top surface 112b and a planar bottom surface 112a. Radially projecting tabs 116 extend from the each apex of the triangular formation which have circumferentially extending portions 116a. The load pins 112 and tabs 116 form part of a main body 111 of the rope termination 100. The main body 111 shown in the figures is substantially cylindrical where circumferential edges of the tabs 116 form part of the cylindrical surface of the main body 111. The rope termination 100 comprises a radially extending side inlet 115 for each load pin 112 which extends into the main body 111 to connect to the central opening 114.

The rope termination 100 further comprises a forward portion 120 extending axially forward from the main body 111 parallel the longitudinal axis 118. The forward portion 120 has a flanged portion 122 that extends radially beyond the forward portion 120. The flanged portion 122 is adapted to engage with restraining means of a rope connection assembly to establish a connection. Between the forward portion 120 and the main body 111, the rope termination 100 comprises a shoulder 113 that has a greater diameter than the forward portion 120 and flanged portion 122, but has a smaller diameter than the main body 111.

The rope termination 100 may be connected to the spliced, looped ends of a multi-core rope such as the one shown in FIG. 2. The rope 19 may be connected to the rope termination 100 by threading each sub-rope 21-32 through the central opening 114 and out through side inlets 115 and splicing each sub-rope 21-32 back into itself. The load pins 112 are set into the rope termination 100 so that when the sub-ropes 21-32 are looped on to the load pins 112, they do not protrude beyond the radius of the main body 111 and are therefore not exposed.

Figure 7:
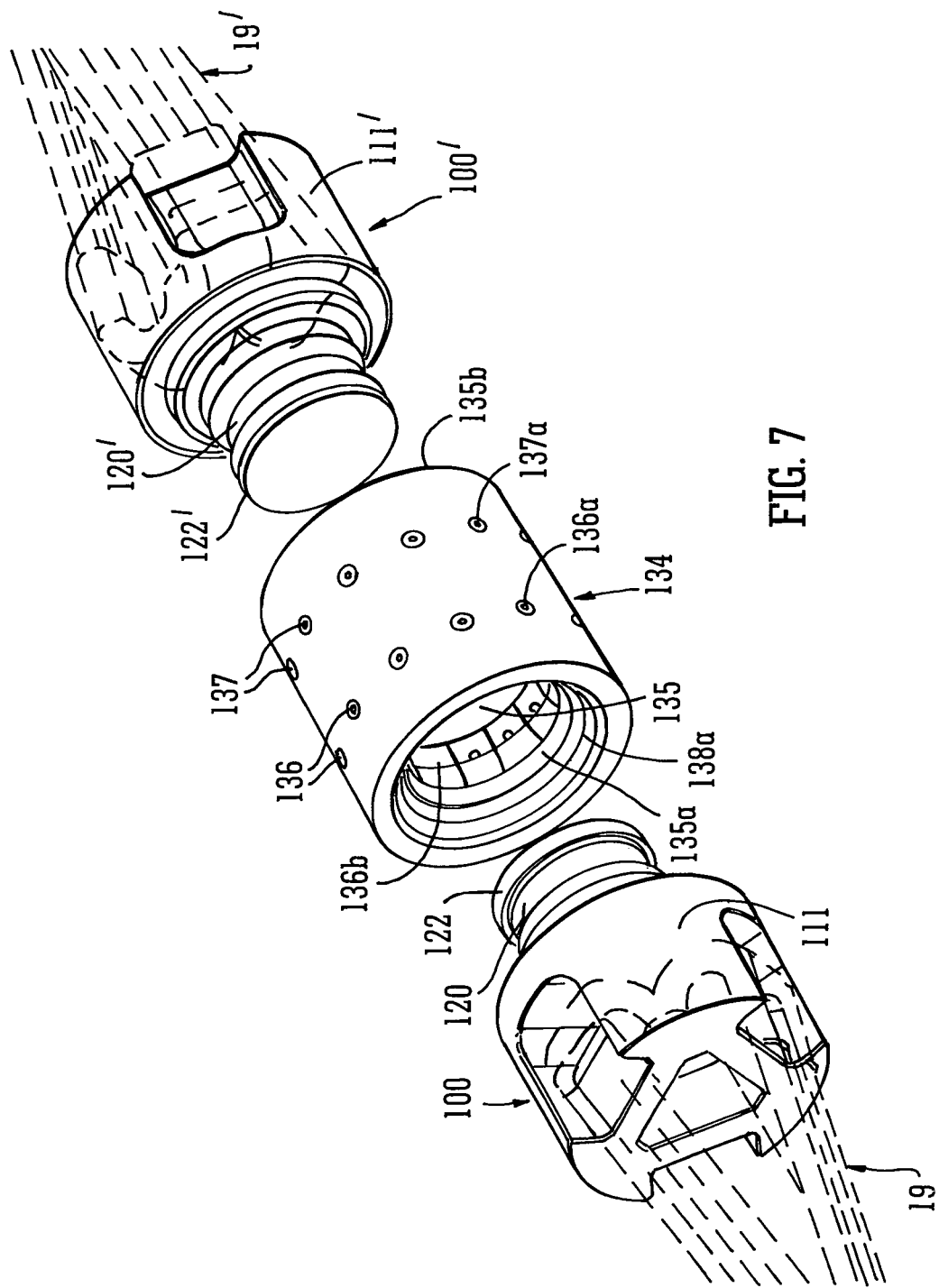
FIG. 7 is a perspective view of an alternative embodiment of a rope connection assembly according to the invention and two rope terminations according to those shown in FIGS. 6A-6D.

In order to connect two identical rope terminations 100, 100', each rope termination 100, 100' is respectively inserted into a first open end 135a and second open end 135b of a tubular rope connection assembly 134. Each rope termination 100, 100' is connected to a multi-core rope 19, 19', preferably by splicing each sub-rope 21-32 as described above. The rope connection assembly 134 shown in FIG. 7 is cylindrical with a central bore 135. A first set of locking dogs 136 is located proximal the first open 135a and a second set of locking dogs 137 is located proximal the second open end 135b. Each set of locking dogs 136, 137 comprises a bolt 136a, 137a and an engaging pad 136b, 137b. The locking dogs 136, 137 are biased radially inwards by springs 136c, 137c (see FIG. 8B). The engaging pads 136b, 137b have a tapered profile that contacts the flanged portions 122, 122' as they are inserted into the bore 135 and are forced radially outward momentarily. Once the flanged portions 122, 122' are no longer in radial alignment with the engaging pads 136b, 137b, the locking dogs 136, 137 move radially inwards once more and block the axial path of the flanged portions 122, 122'. This occurs when the rope terminations 100, 100' are inserted into the open ends until shoulders 113, 113' abut rims 138a, 138b of the rope connection assembly 134. At this point, the first set of locking dogs 136 is axially aligned between the flanged portion 122 and the shoulder 113 of the rope termination 100 and the second set of locking dogs 137 is radially aligned between the flanged portion 122' and the shoulder 113' of the rope termination 100'.

Figure 8A:
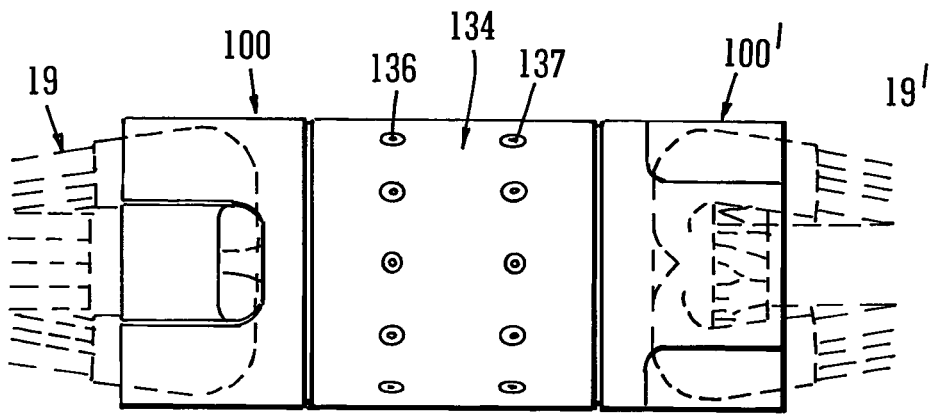
FIG. 8A is a side view and FIG. 8B is the corresponding cross-sectional view of the rope connection assembly of FIG. 7.
Figure 8B:
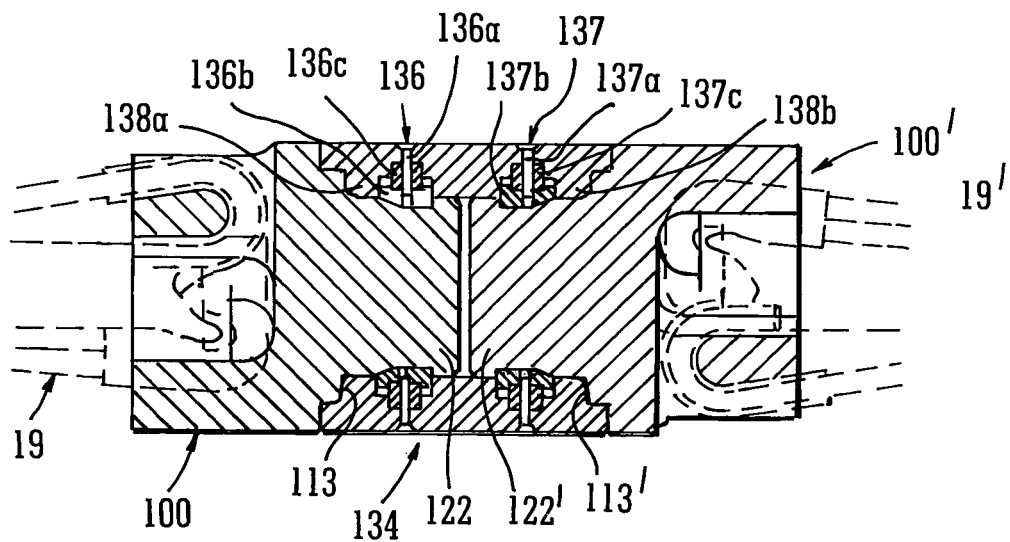
Figure 9A:
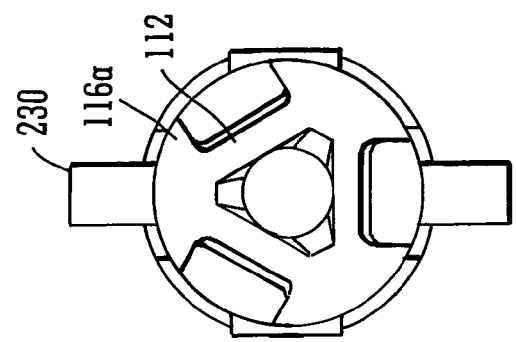
FIGS. 9A to 9D are respectively a side view, an end view in the direction of arrow B in FIG. 9A, a section on the line A-A in FIG. 9A and a perspective view of a rope termination and interconnection according to a further embodiment of the present invention.
Figure 9B:
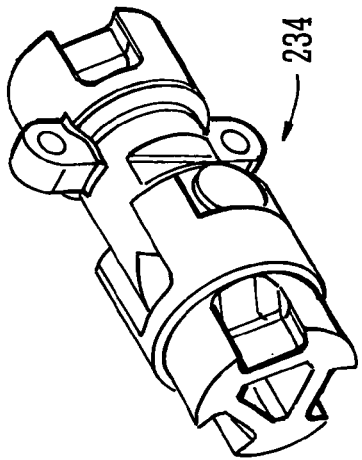
Figure 9C:
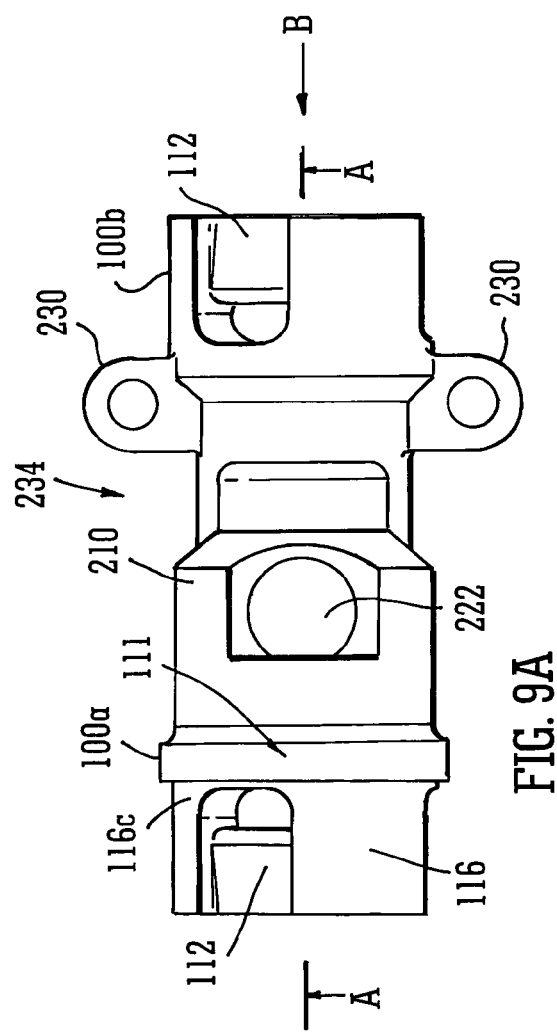
Figure 9D:
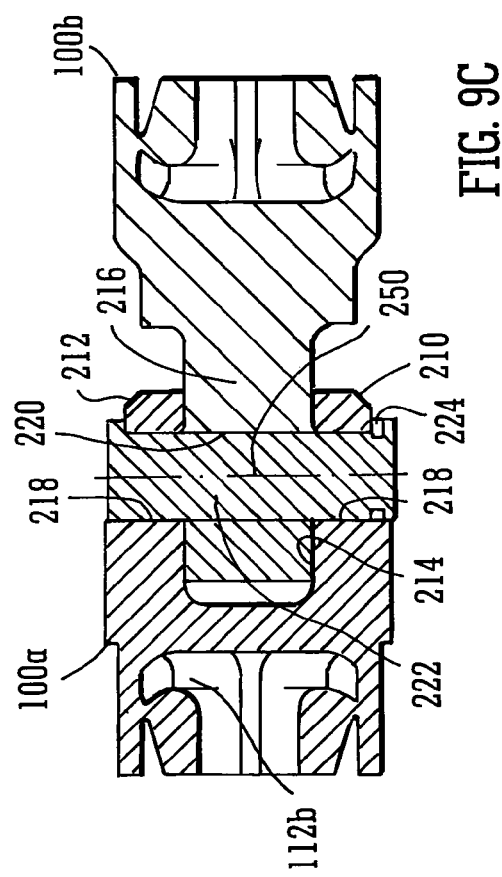
Figures 10A, 10B:
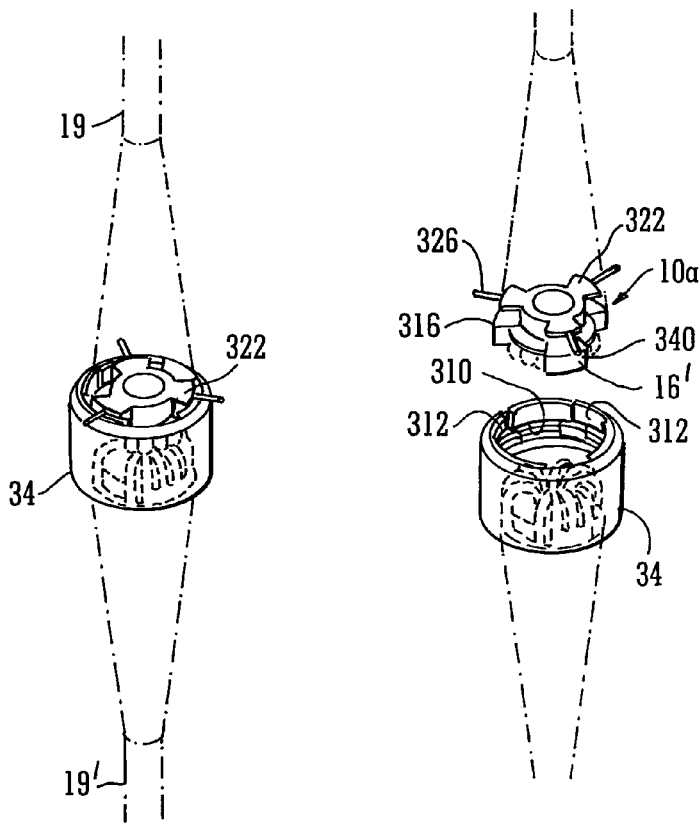
FIGS. 10A and 10B are perspective views of a rope connection according to a further embodiment of the present invention, connected and disconnected respectively.

When the rope terminations 100, 100' are engaged around their circumferences in this way by the plurality of locking dogs 136, 137, the rope terminations 100, 100' are axially restrained with respect to one another within the rope connection assembly 134 (see FIGS. 8A and 8B). Axial tension from the ropes 19, 19' is transmitted to rope terminations 100, 100' and to the rope connection assembly 134 via flanged portions 122, 122' and locking dogs 136, 137. The rope terminations 100, 100' may be released by moving the locking dogs 136, 137 radially outward using bolts 136a, 137a to clear the axial path of flanged portions 122, 122'.

Turning to FIGS. 9A to 9D, a variation on the connection mechanism for a rope termination according to the embodiments of FIGS. 6, 7 and 8 is illustrated. Here, a rope termination assembly 234 has two rope terminations 100a,b, each having the same configuration of load pins 112 as described above. However, instead of the plug or forward portion 120 of the embodiment described above, one rope termination 100a is provided with two flanges 210,212 between which is a slot 214. The other rope termination 100b has a central spade 216 that is a close sliding fit in the slot 214. Each flange 210,212 is provided with a concentric bore 218, and the spade 216 has a corresponding bore 220. The bores 218,220 can be aligned when the spade is appropriately inserted into the slot 214, whereupon a pin 222 can be fitted to connected the rope terminations 100a,b together. The connection is such that there is one degree of freedom for the connection between the rope terminations 100a,b, which is rotation about the axis 250 of the pin 222. The pin is locked in position by a suitable circlip 224.

As mentioned above, the rope connection parts of the terminations 100a,b are as described above, in which straight load pins 212 are provided that are tapered in section so that the sub-ropes (not shown), when wrapped around the load pins, do not have any deflection, other than around the curved top surface 112b, of course, which is arranged to have a radius of curvature approximately equal to the diameter of the sub-ropes wrapped around. Each load pin 112 is terminated at each end by the tabs 116 which, themselves, extend axially forwardly of the rope at 116c, and then join radially into the main body 111 of the termination 100a,b. Furthermore, circumferentially extending portions 116a provide further shrouding of the sub-ropes wrapped around the load pins 112.

Consequently, the risks of the sub-ropes being chaffed or otherwise abraded or impacted by external agents is minimized.

To facilitate handling of the connection, at least one of the terminations 100*a,b* is provided with lifting eyes 230.

Turning to FIGS. 10 to 13, an embodiment of the invention is illustrated that is more akin to the embodiment described above with reference to FIGS. 1 to 5. Here, two ropes 19,19' are joined by a connector sleeve 34' and two rope terminations 10*a,b*. Each rope termination 10*a,b* is substantially similar to the rope terminations 10,10' shown in FIG. 1, except that here, the load pins 12' are curved and not straight. While such curved load pin 12' is perfectly feasible, it does result in the sub-ropes in the central opening 14' being somewhat compressed together. Consequently, the arrangement described above with reference to FIG. 1 is preferred. It would be perfectly feasible to use the termination 12 of FIG. 1 in the present embodiment illustrated in FIG. 10. What distinguishes the embodiment of FIG. 10 from that described above with reference to FIG. 1 is the mode of connection of the termination 10*a* in the connector 34'.

The termination connector 34' is a complete sleeve, which is provided with internal flanges 310. Each flange 310 has a smaller diameter than the tabs 16' of the termination 12', so that the tabs can rest on them. However, the flanges 310 are not circumferentially complete, but are broken circumferentially by recesses 312, that are of equal circumferential extent as the circumferential extent of the tabs 16'. Indeed, angularly, it is preferred that the tabs extend at somewhat less than 45 degrees, whereas the slots 312 extend over slightly more. The angular spacing of the recesses 312 is arranged the same as the angular spacing of the tabs 16—that is, conveniently, at 120 degrees spacing when there are three of them. Accordingly, one rope termination 10*b* is insertable into the sleeve 34' by angular alignment of the tabs 16' of the termination with the recesses 312. Once the termination 10*b* is fully inserted into the recesses 312 (so that bottom edge 316 of each tab extends beyond the flanges 310), the termination 10*b* can be rotated in the sleeve 34' until those bottom edges 316 register with the flanges 310.

Figures 11A, 11B:
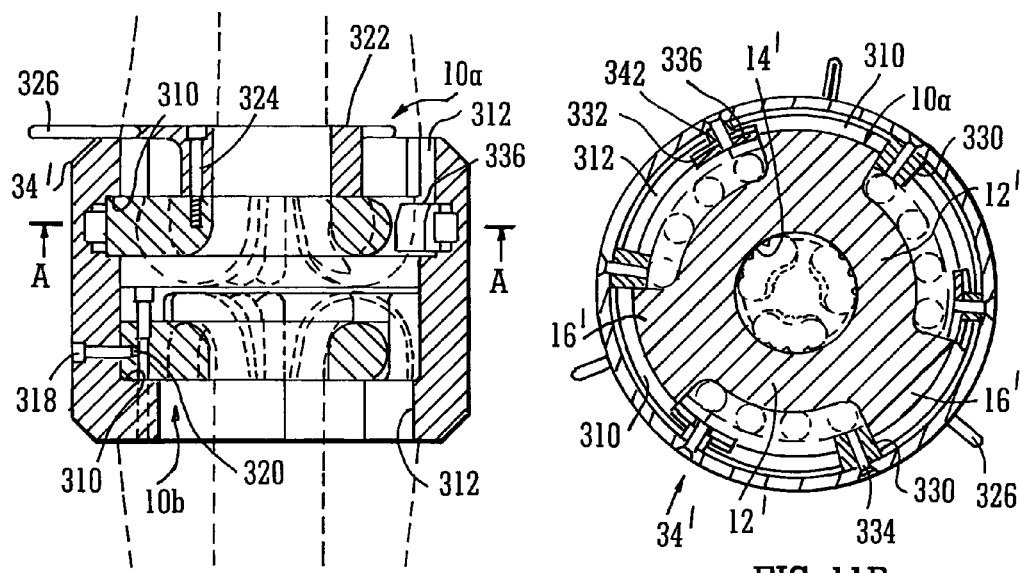
FIGS. 11A and 11B are respectively a side section and a cross section along the line A-A in FIG. 11A, of the rope connection illustrated in FIGS. 10A and 10B.
Figure 12A:
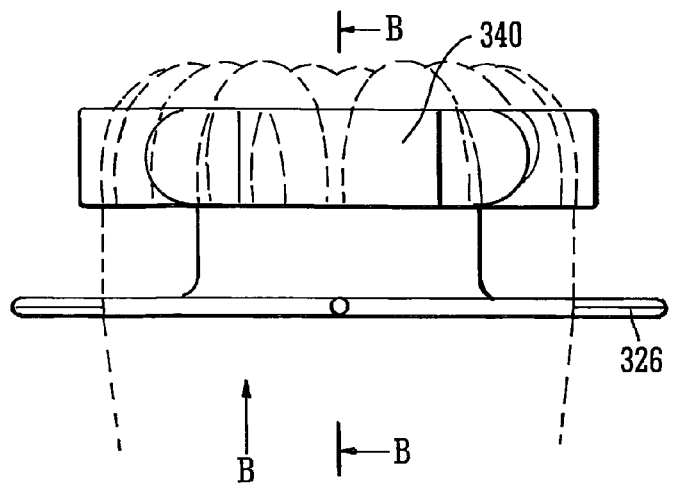
FIGS. 12A to 12C are respectively a side view, an end view in the direction of the arrow B in FIG. 12A and a section along the line B-B in FIG. 12A of a rope termination according to the embodiment of FIGS. 10A and 10B.
Figure 12B:
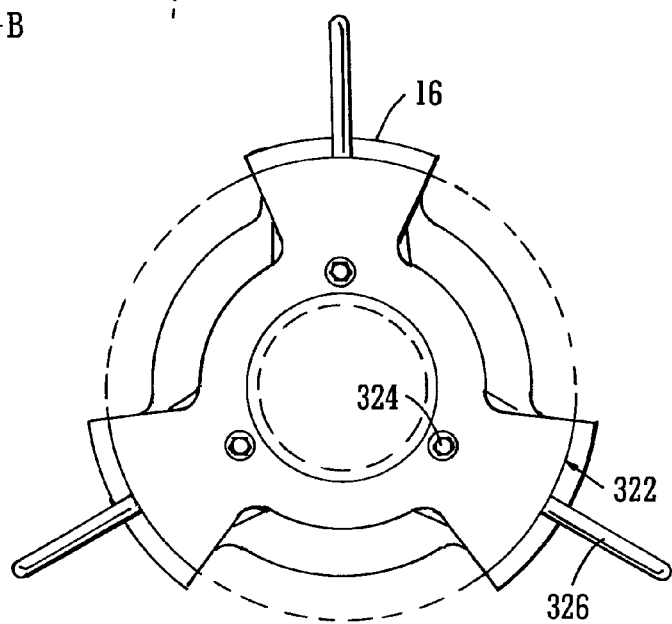
Figure 12C:
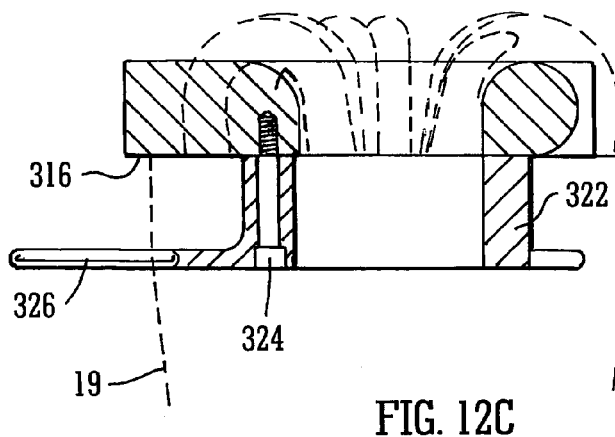
Figure 13A:
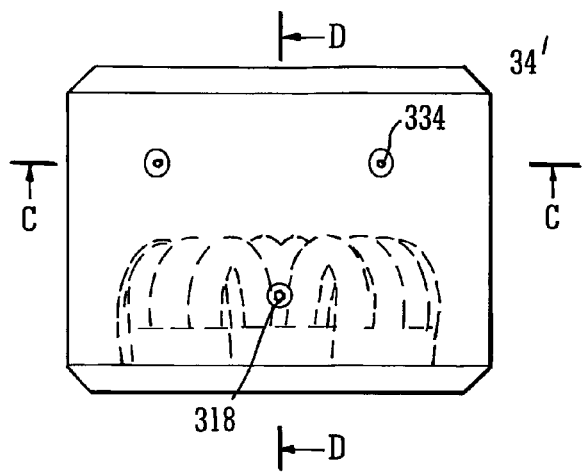
FIGS. 13A to 13C are respectively a side view, a section along the line D-D in FIG. 13A and a section along the line C-C in FIG. 13A of the connector of the embodiment illustrated in FIGS. 10A and 10B.
Figure 13B:
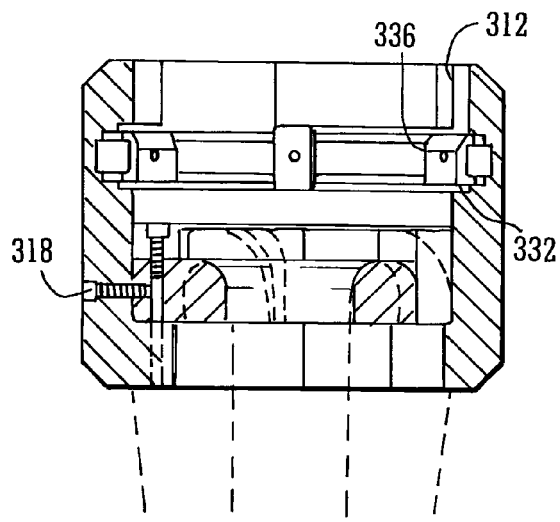
Figure 13C:
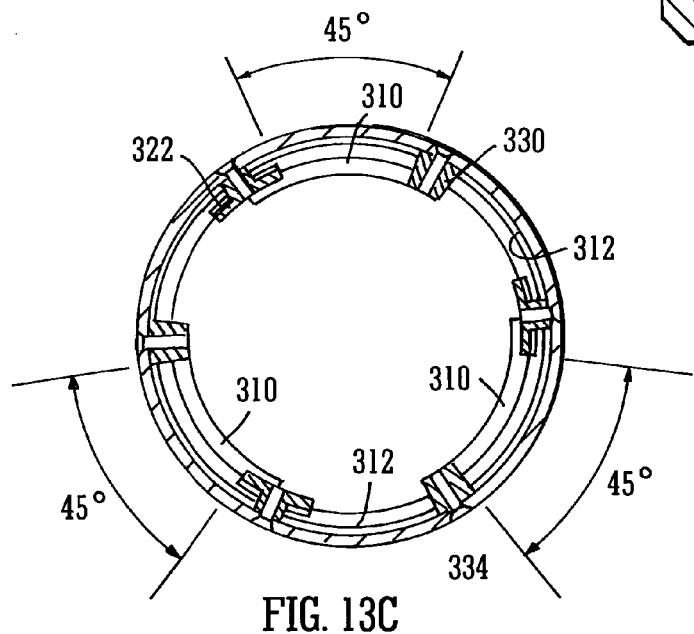

In FIG. 11A, the first termination 10*b* is located in registry with the flanges 310 and is secured in that position by the use of bolts 318 in the wall of the connector 34' and engaging a threaded bore 320 provided for this purpose in the face of the tab 16'. Accordingly, although ropes 19,19' may have identical terminations 10*a,b* on their ends, one might additionally have the connector 34' permanently connected. However, the second termination 10*a* is provided with an extension pot 322, fitted between the sub-ropes 19 and connected to the rope termination by axially aligned bolts 324.

Handles 326 extend radially outwardly from the pot 322, enabling the rope termination 10*a* to be handled. Thus the termination 10*a* can be rotated using the handles 326 so as to align the tabs 16' with the recesses 312 so that the termination 10*a* can be inserted into the connector 34'. On this side of the connection, the flange 310 is not maintained in registry with the tabs 316 by screws 318. Instead it is delimited by stops 330,332. The stops 330 are at one end of the flange 310, and they are permanent stops that prevent rotation (in the case of FIG. 11B in the clockwise direction) beyond full registration of the tab 16' with each flange 310. In this case, the stop 330 is simply bolted in position to the connector 34' by screws 334. However, the stops 332 are radially outwardly displaceable and, indeed, are provided with a cam surface 336 that coincides with the recess 312. Thus, when the tabs 16' are inserted into the recesses 312, before full engagement is achieved, the tabs displace the stops 332 radially outwardly.

When fully engaged, therefore, the termination 12' can be rotated; the face 340 of each tab bears against the stops 332. However, upon full rotation of the termination 12' (when the tabs 16 strike the stops 330 at the end of the flange 310) the other end of the tabs 16' are released from the stops 332, which snap radially inwardly to lock the termination 12' in registry with the flanges 310. A spring 342 is disposed between the stop 332 and the wall of the sleeve member 34'.

The rope connection assemblies 34, 34', 134 and 234 can therefore be used to connect two suitably terminated multi-core ropes such that the rope connection assemblies can support and transmit load. The overall integrity of such connections is enhanced by employing the specific rope terminations 10, 10*a,b*, 100 and 100*a,b* and splicing techniques described above. The nature of the rope connection assemblies 34, 34', 134 and 234 and rope terminations 10, 10*a,b*, 100 and 100*a,b* are such that secure, load-bearing connections can be made easily and quickly. As described above, the rope connection assemblies are not limited to the illustrated embodiments. Alternative embodiments may involve the rope connection assembly 34, 34', 134, 234 forming an anchoring point for a terminated rope. In other alternative embodiments, the rope connection assembly may comprise the plug-like part of the connection whilst the rope termination may comprise the socket-like part of the connection.

In some embodiments, a sleeve, made of polyurethane or similar material, could be used around the end of the rope 19 and rope termination 10 or 100 to limit the bending imposed on the rope 19 and sub-ropes 21-32 during deployment and operation of the rope 19. Alternatively, any voids in the rope termination 10, 10*a,b*, 100 and 100*a,b* and/or rope 19 may be filled with flexible filling material to achieve the same result.

All embodiments of rope termination 10, 10*a,b*, 100 and 100*a,b* may be made of steel or composite and are each preferably supplied connected to a spliced rope. The simple geometric design and compact shape of the rope terminations 10, 10*a,b*, 100 and 100*a,b* therefore mean that the rope 19 and rope termination 10, 10*a,b*, 100 or 100*a,b* may be relatively light weight and easily supplied and transported as a single unit. The rope connection assemblies 34, 34', 134, 234 may also be made from light weight materials, but may be supplied separately from the ropes 19 and rope terminations 10, 10*a,b*, 100 and 100*a,b*.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A rope connection comprising:
a rope termination of a rope having a longitudinal axis and a plurality of sub-ropes, said rope termination comprising a termination member having proximal and distal ends and a plurality of load pins formed in a closed annulus around said longitudinal axis, each of said plurality of sub-ropes being spliced into itself to form a looped end arranged around said load pins and each of said plurality of sub-ropes being of equal length, wherein said termination member further comprises at least two tabs interconnecting said load pins, which said tabs extend radially outwardly from said longitudinal axis such that a circular cylindrical surface concentric with said longitudinal axis and intersecting said tabs entirely surrounds said load pins and said sub-ropes disposed around said load pins, said rope extending from said proximal end of the termination member; and
a connector for connection with said tabs;
whereby tension in the rope is equally transferred to said connector through said tabs and equally divided between said load pins and each of said plurality of sub-ropes.

2. The rope connection according to claim 1, wherein said connector comprises a sleeve member having an internal flange on which proximal surfaces of said tabs rest.

3. The rope connection according to claim 2, wherein said sleeve member comprises two clamshell halves which are interconnectible about said rope termination, said internal flange being circular.

4. The rope connection according to claim 3, wherein said flange is undercut, and said tabs are correspondingly inclined, whereby axial tension on the rope causing axial forces between said tabs and flange serves to draw said clamshell halves towards one another.

5. The rope connection according to claim 2, wherein said internal flange of the sleeve member is interrupted with as many axial gaps as there are tabs, said gaps being arranged around the sleeve in the same spacing as said tabs around said longitudinal axis, whereby said rope termination is insertable axially in said sleeve with said tabs aligned with said gaps and then is rotatable to engage said tabs with said interrupted flange, locking means being provided to prevent subsequent rotation of the rope termination with respect to the sleeve.

6. The rope connection according to claim 5, wherein said locking means comprises fixed stops and selectively operable stops at each end of each gap, said selectively operable stop being disengaged to permit insertion of said rope termination in said sleeve.

7. The rope connection according to claim 6, wherein said selectively operable stops are spring-loaded and have a cam surface engaged by said tabs on insertion of the rope termination in said sleeve to deflect said stops radially outwardly, said stops snapping radially inwardly to prevent back rotation of the rope termination after forward rotation thereof to engage said tabs with said interrupted flange.

8. The rope connection according to claim 1, wherein said connector is adapted to connect two of said rope terminations end to end.

9. The rope connection according to claim 1, wherein said tabs extend distally with respect to the rope and are interconnected to form a terminal body constituting the distal end of the termination member, the connector connecting with said terminal body.

10. The rope connection according to claim 9, wherein said connection comprises a cylindrical plug, whose axis is coincident with said longitudinal axis, the plug being disposed on one of said terminal body and connector, and a sleeve socket on the other of said terminal body and connector, wherein a flange is defined on one of said plug and socket and selectively operable locking dogs are on the other of said plug and socket so as to engage with said flange when said is plug is inserted in said socket, whereby said plug is axially locked in said socket.

11. The rope connection according to claim 10, wherein said locking dogs are spring-loaded so as to snap into engagement with said flange on insertion of said plug in said socket.

12. The rope connection according to claim 10, further comprising a seal between said connector and said termination when said plug is received in said socket.

13. The rope connection according to claim 9, wherein said connection comprises a slot in one of said terminal body and connector and a spade member in the other of said terminal body and connector, apertures being formed across said slot and through said spade member that can be aligned when said spade member is inserted in said slot, a pin being receivable in said apertures to make the connection.

14. The rope connection according to claim 13, wherein, when the spade member is received within said slot and the pin is in said apertures, the connector has one degree of freedom of movement with respect to the rope termination comprising partial rotation of one with respect to the other about an axis defined by the pin.

15. The rope connection according to claim 14, wherein said rotation axis is perpendicular said longitudinal axis.

16. The rope connection according to claims 9, wherein said connector comprises the terminal body of a second rope termination, whereby two ropes may be connected distal end to distal end.

17. The rope connection according to claim 1, comprising m sub-ropes and n load pins between n tabs and m/n sub-ropes engage each load pin, where m/n, m and n are all whole numbers.

18. The rope connection according to claim 17, comprising three load pins arranged in a triangular formation and a said tab projecting from each vertex of said triangular formation.

19. The rope connection according to claim 1, wherein the load pins are straight.

20. The rope connection according to claim 1, wherein said tabs have circumferentially extending portions to shroud the ends of the load pins and further protect the sub-ropes on the load pins.

21. The rope connection according to claim 1, wherein said load pins each have a section in a radial plane that comprises a circular end of radius greater than or equal to 1.5 times the radius of the sub-rope and sides that taper by an amount equal to or less than the angle subtended by said looped end of the sub-rope at said 22. A rope termination of a rope having a longitudinal axis and a plurality of sub-ropes, said rope termination comprising a plurality of load pins formed in a closed loop around said longitudinal axis and each of said plurality of sub-ropes being spliced into itself to form a looped end arranged around said load pins, each of said plurality of sub-ropes being of equal length, wherein said load pins each have a section in a radial plane that comprises a circular end of radius greater than or equal to 1.5 times the radius of the sub-rope and sides that taper by an amount equal to or less than the angle subtended by said looped end of the sub-rope at said splice when arranged around said load pin, such that each said sub-rope is without a deflection between said circular end of the load pin and the splice. splice when arranged around said load pin, such that each said sub-rope is without a deflection between said circular end of the load pin and the splice.

23. A rope connection comprising:
a rope termination of a rope having a longitudinal axis and a plurality of sub-ropes, said rope termination comprising a termination member having proximal and distal ends and three load pins arranged in a triangular formation around said longitudinal axis, each of said plurality of sub-ropes being spliced into itself to form a looped end arranged around said load pins and each of said plurality of sub-ropes being of equal length, wherein said termination member further comprises three tabs interconnecting said load pins, each tab projecting outwardly from each vertex of said triangular formation such that a circular cylindrical surface concentric with said longitudinal axis and intersecting said tabs entirely surrounds said load pins and said sub-ropes disposed around said load pins, said rope extending from said proximal end of the termination member; and
a connector for connection with said tabs;
whereby tension in the rope is equally transferred to said connector through said three tabs and equally divided between said three load pins and each of said plurality of sub-ropes.

\* \* \* \* \*

UNITED STATES PATENT AND TRADEMARK OFFICE
CERTIFICATE OF CORRECTION

PATENT NO.         : 8,782,856 B2                                                       Page 1 of 1
APPLICATION NO.    : 13/266828
DATED              : July 22, 2014
INVENTOR(S)        : Hong Tri Thoi et al.

It is certified that error appears in the above-identified patent and that said Letters Patent is hereby corrected as shown below:

In the Specification,

Column 14, Line 62 reads, "sub-rope at said" which should read, "sub-rope at said splice when arranged around said load pin, such that each said sub-rope is without a deflection between said circular end of the load pin and the splice."

Column 15, Lines 9-11 read, "and the splice. splice when arranged around said load pin, such that each said sub-rope is without a deflection between said circular end of the load pin and the splice." which should read, "and the splice."

Signed and Sealed this
Tenth Day of February, 2015

Michelle K. Lee
*Deputy Director of the United States Patent and Trademark Office*